May 9, 1961 J. H. WEBER 2,983,793

DICTATION SYSTEM

Filed May 20, 1958 2 Sheets-Sheet 1

INVENTOR.
JOSEPH H. WEBER

BY

ATTORNEY

May 9, 1961 J. H. WEBER 2,983,793

DICTATION SYSTEM

Filed May 20, 1958

2 Sheets-Sheet 2

*INVENTOR.*
JOSEPH H. WEBER

*BY* Stuart F. Moore

ATTORNEY

United States Patent Office 2,983,793

Patented May 9, 1961

2,983,793

DICTATION SYSTEM

Joseph H. Weber, 10 E. 10th St., New York 3, N.Y.

Filed May 20, 1958, Ser. No. 736,629

22 Claims. (Cl. 179—100.1)

This invention relates to recording and transcribing systems and more particularly relates to a system for recording a plurality of voices and automatically identifying the speaker as his recorded words are being transcribed.

There are many dictating and transcribing systems available which record the human voice on spirally grooved phonograph discs, magnetic tapes, embossed plastic material, or on other recording media. The transcribing apparatus is usually capable of reproducing the exact spoken words of the dictator with reasonable fidelity and provides means for repetitively playing back any portion of a recorded conversation. However, such apparatus is limited in use for recording spoken words of not more than two speakers in any one conversation, as identification by the transcriber of more and two speakers becomes difficult, if not impossible. Thus, when conferences, hearings, trials and other group events having more than one or two speakers must be recorded and the speakers identified, highly skilled personnel are required to both manually record the uttered speech and identify the speaker.

Such a system has the disadvantage of being inaccurate as there is no permanent record of the proceedings other than the reporter's shorthand notes. Further, it is economically unsound since highly trained personnel must be employed for such work. Heretofore, in some instances, semi-automatic techniques have been used to record group conferences. Generally, such techniques utilize a plurality of microphones connected to a single recording device. An attendant is employed to adjust constantly the gain controls of the various microphones and also to actuate manually an external indicating device for identifying the speaker.

It is therefore an object of the invention to provide completely automatic apparatus for recording the actual voices of a plurality of speakers and to provide simultaneously a permanent identification of the speaker on the recording medium.

It is a further object of the invention to provide a recording and transcribing system wherein the identity of each speaker is indicated automatically as his exact speech is being transcribed.

Still another object of the invention is to provide means for superimposing on a record a discrete identification signal associated with each voice of a plurality of recorded voices, and to provide means responsive to each identification signal for actuating a discrete indicator designating a selected speaker concurrently with audible reproductions of said record.

In accordance with the invention, a plurality of microphones are provided, each assigned to a different speaker. Means actuated by a speaker's microphonically translated voice signals are provided for superimposing identifying high frequency signals upon the recording medium during the entire period of an utterance. Further means are provided for partially disabling the remaining microphones and associated sound channels when one individual is speaking. The present invention further includes transcribing means having filtering devices associated therewith for channeling the identifying signals into an identity indicator selecting means where indicators adapted to identify the speaker are selected in response to the presence of signals of predetermined frequencies.

For a better understanding of the invention together with other and further objects thereof, reference is made to the following detailed description taken in connection with the accompanying drawings, in which.

In order to simplify the description of the invention, only two microphones and associated audio channels are shown in the figures. The units comprising the channels are designated "1" and "N." It will be understood that the invention is not limited only to the provision of two channels but any practical number of microphones and associated channel units may be used to accommodate any desired number of dictators or speakers at a given conference, merely by duplicating the channel equipment about to be described. The number of channels and speakers which may be accommodated by the present invention is limited only by the noise level existing at the operating location. It has been found that the system will easily accommodate and identify at least five speakers.

Figure 1:
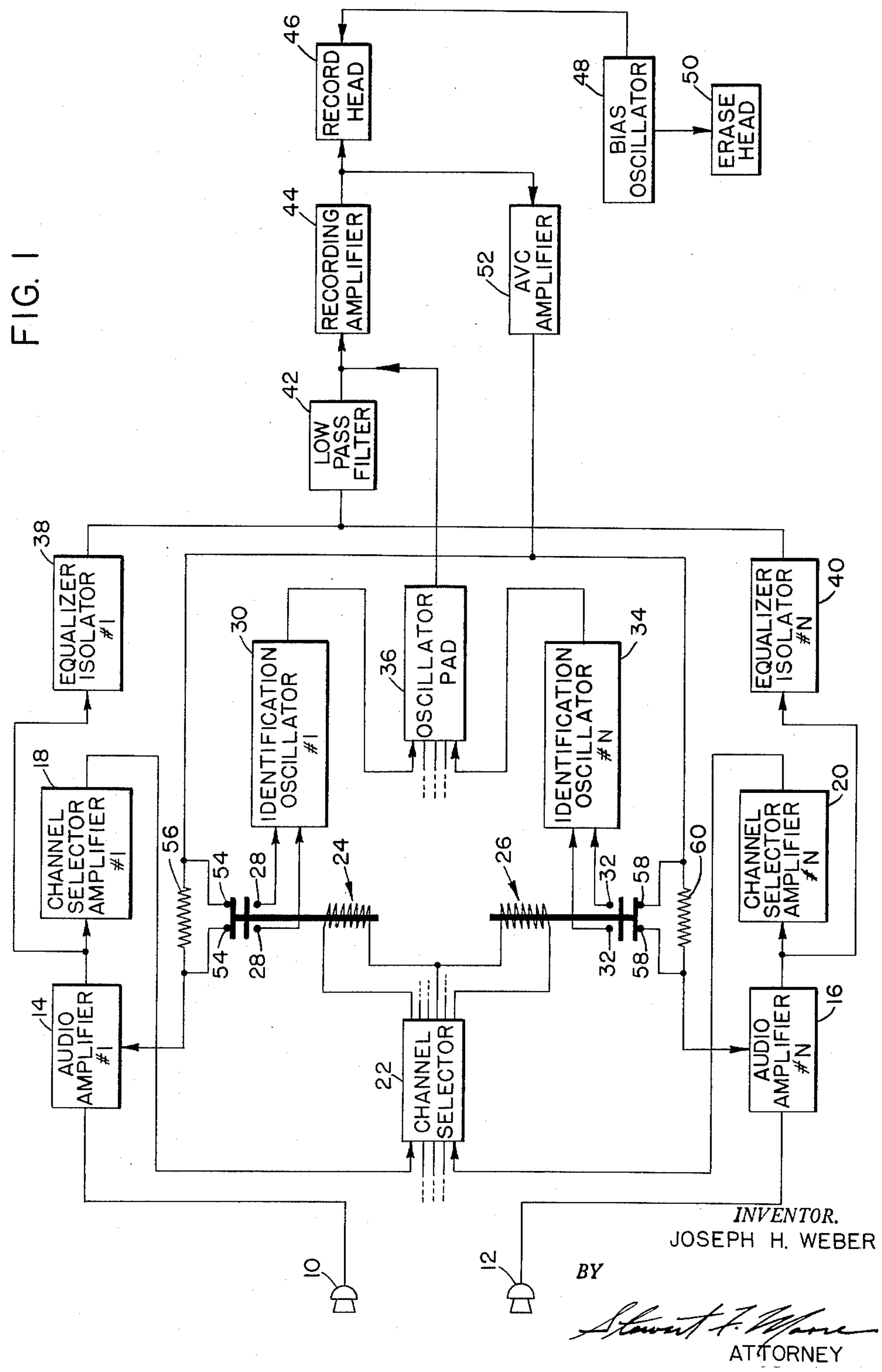
Fig. 1 shows a block schematic diagram of an embodiment of the recording apparatus of the present invention.

Referring now to the drawings, in Fig. 1 microphones 10, 12 are shown connected to one or more amplifier stages 14, 16, respectively. Each microphone is associated with a single oral dictator or speaker and is always maintained in a "live" or "on" position during the conference. The microphone may be placed on the table immediately in front of the speaker if he is seated, or worn around his neck if he is standing or moving. The speech signals amplified by amplifiers 14, 16 are fed to additional channel amplifiers 18, 20 which further amplify the speech signals and transmit them to a channel selector 22. Amplifiers 14, 16, 18, 20 are conventional audio voltage amplifiers of the type well known in the art. It is important, if best results are to be obtained, that speech intended for one microphone be confined thereto and not be permitted to appear at a lower level in other channels to possibly cause misidentification. This cross talk may be effectively reduced to a minimum by providing circuit means for accentuating the high frequencies in one of the channel amplifiers, preferably channel selector amplifiers 18, 20. Since the higher speech frequencies are more directional and more rapidly attenuated with distance, then by accentuating the high frequencies, greater differences in signal amplitude between active and unused channels will appear at the inputs to channel selector 22. Such high frequency accentuating means associated with amplifiers 18, 20 may be any conventional "treble boost" circuit. For example, a frequency discriminating feedback circuit may be used, if desired.

Channel selector 22, described in more detail below, has a plurality of relays 24, 26 connected to its output terminals. Each relay 24, 26 is associated with channels 1 and N, respectively, and is actuated by channel selector 22 whenever a voice signal is received by its associated channel. Relay 24 has a pair of contacts 28, which, when closed are adapted to actuate an identification oscillator 30 having a selected output frequency by connecting a source of energizing voltage thereto or by any other suitable means. Relay 26 has a pair of contacts 32 which actuate another identification oscillator 34 when they are closed. Oscillators 30, 34 are conventional audio oscillators with discrete output frequencies selected to identify voice signals amplified by its associated channel units. For example, the oscillators may be simple Colpitts oscillators with series reactances to stabilize their frequencies. The output frequencies of the oscillators are preferably higher than the highest voice frequency to be recorded so that they may be segregated from subsequent voice channels by suitable filters. The tone signal outputs of oscillators 30, 34 are fed to a conventional attenuating pad 36 which serves to isolate the identification oscillators from the input of the recording unit and also reduces the output amplitudes of the oscillators to selected low levels to prevent overloading of the recording head.

Audio amplifiers 14, 16 also have their outputs connected to conventional equalizer circuits 38, 40. Equalizer circuits 38, 40 may be resistance-capacitance networks which alter the frequency content of the signal associated therewith to complement the usual, non-linear response of the recording head. Equalizers 38, 40 are selected and designed for the specific recorder for which the present invention is intended to be used. Thus, the values of the components comprising equalizers 38, 40 will be of different design depending on whether a magnetic tape recording head, or a coil-driven stylus for cutting spiral groove records, or other types of recording devices are used. Equalizers 38, 40 also isolate the outputs of audio amplifiers 14, 16 from each other to prevent the output signals of one amplifier from feeding into the input of a channel selector amplifier of another channel to cause misidentification. Therefore, the channel amplifier outputs are connected only to designated inputs of channel selector 22.

The outputs of equalizers 38, 40 are connected in parallel with each other and to the input of a low pass filter 42. As the usable intelligence frequencies of a human voice are generally below 4,000 cycles, a conventional low pass filter having a cutoff frequency of 4,000 cycles, and a maximum rejection frequency of 4,500 cycles, has been found to be satisfactory. Low pass filter 42 prevents the recording of high frequency voice components which would cause false actuation of the speaker identification indicating device on the transcribing unit of the system. If a 4,000 cycle filter is employed, then oscillators 30, 34 may have output frequencies lying in the audio spectrum above 4,000 cycles.

The outputs of oscillator pad 36 and low pass filter 42 are fed to a common input terminal on a recording amplifier 44 where the speech and identification signals are combined as a composite signal. This amplifier may be any conventional audio amplifier which is modified to drive a recording head 46 to which it is connected in accordance with the amplitude and frequency of the composite voice and identification signals of each speaker.

Figure 2:
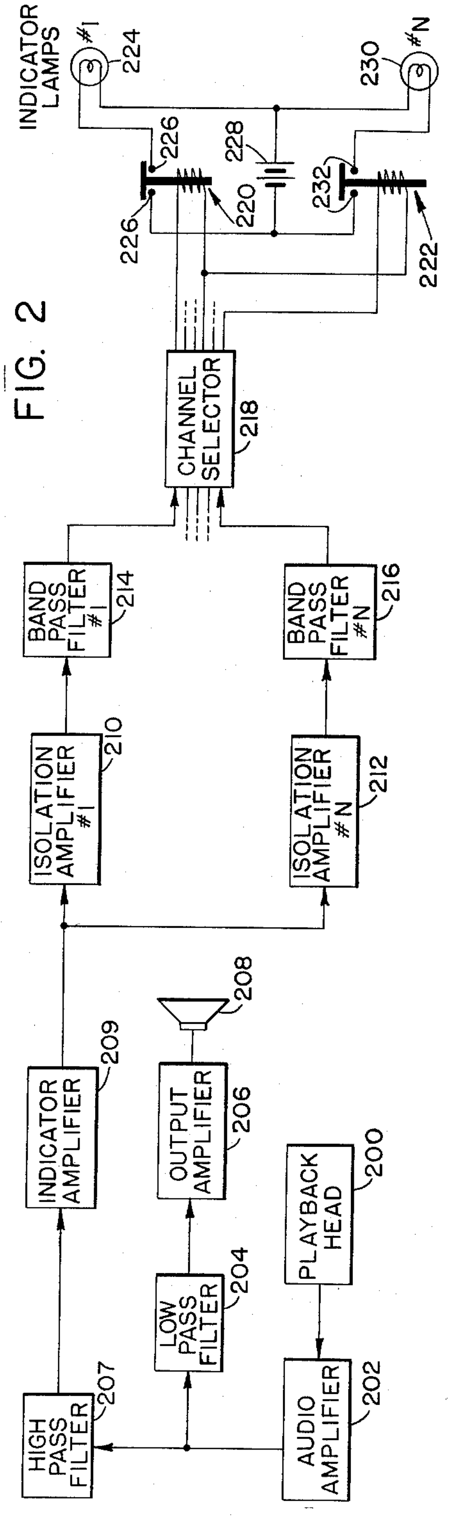
Fig. 2 shows a block schematic diagram of an embodiment of the transcribing apparatus of the present invention.

The present invention is adapted for use with any known recording apparatus of the type adapted to record speech signals on a reproducible sound record, such as a disc, wire or magnetic tape recorder. For purposes of illustrating the invention, however, the major circuit units for endless magnetic belt recording apparatus are shown in Figs. 1 and 2. Thus a bias oscillator 48 is connected to recording head 46 and to an erase head 50. Bias oscillator 48 provides an ultrasonic signal for correcting the non-linear magnetic characteristics of the recording material and also provides a current for the conventional erase head 50. In application where the invention is used in connection with the recording of voices on an endless belt type of reproducible sound record formed from magnetic material, an erase head which removes previously recorded speech is necessary to allow the belt to be re-used for subsequent conversations.

The output of recording amplifier 44 is also connected to the input of an automatic volume control amplifier 52. AVC amplifier 52 is a conventional AVC signal amplifier well known to those skilled in the art, and preferably includes a diode circuit element for rectifying a portion of the output signal from recording amplifier 44 and a filter circuit for smoothing the rectified voltage into substantially D.C. to provide a bias for audio amplifiers 14 and 16. The AVC circuit preferably has a time constant of approximately one-half second to allow long time averages of the speech signals to control the gain of amplifiers 14 and 16 rather than individual syllables. The output of AVC amplifier 52 is connected to amplifier 14 through a pair of normally closed contacts 54 of relay 24.

A resistor 56 of suitable value is connected across contacts 54 to attenuate the AVC voltage applied to amplifier 14 when relay 24 is energized. The AVC voltage of AVC amplifier 52 is also applied as a bias voltage to audio amplifier 16 through a pair of normally closed contacts 58 of relay 26. A resistor 60 of suitable value is also connected across contacts 58 to allow AVC voltage of a reduced value to be applied to amplifier 16 when relay 26 is energized. AVC voltage output from AVC amplifier 52 is preferably connected to the control electrodes of the electronic valves comprising the amplifying stages of audio amplifiers 14 and 16 in such a manner that the gain of amplifiers 14 and 16 is substantially reduced whenever a signal appears at the output of recording amplifier 44.

It will be noted that whenever relay 24, 26 is energized by channel selector 22 in response to a channel in use by a speaker, the controlled amplifier of that channel will have a reduced AVC voltage applied thereto since either contacts 54 or 58 open to allow either resistor 56 or 60 to attenuate the AVC voltage. It is preferable that the AVC voltage applied to amplifiers 14, 16 be sufficient to substantially reduce the gain of the amplifiers not in use whenever contacts 54 or 58 are closed, as the case may be, to reduce the noise level of channels not in service to the minimum.

Figure 3:
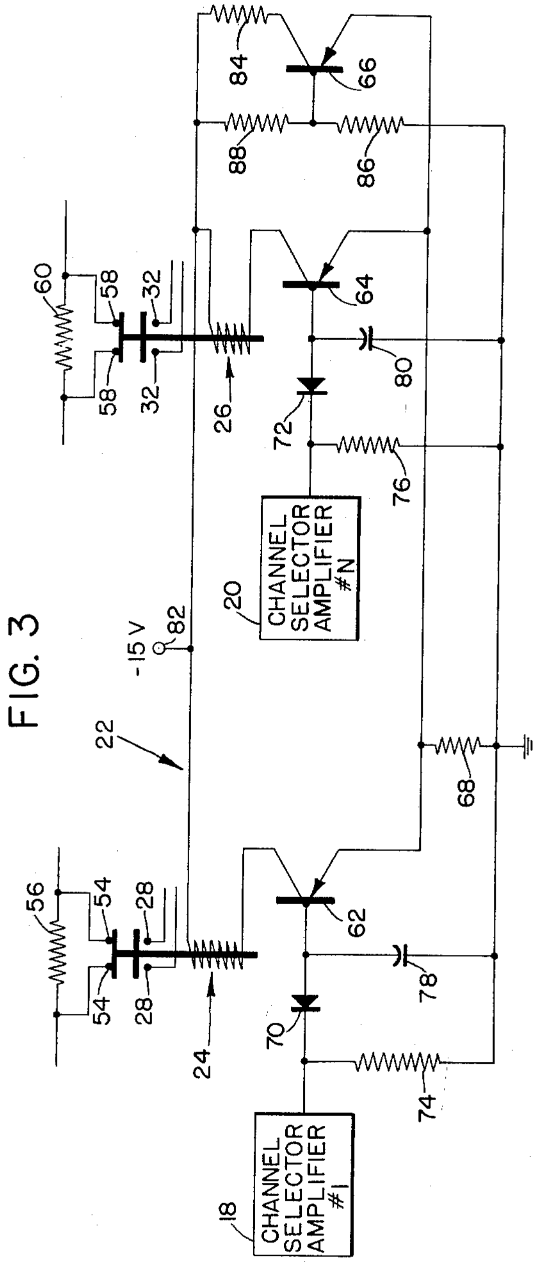
Fig. 3 is a circuit diagram of an embodiment of the channel selector shown in Fig. 1.

Selector 22, shown in more detail in Fig. 3, includes a number of transistors 62, 64, 66 connected in parallel with a common emitter resistor 68. Transistors 62, 64 and 66 are switching type transistors which are adapted to saturate upon application of a negative base to emitter voltage. The outputs of channel selector amplifiers 18 and 20 are respectively connected in series with diodes 70 and 72 and the base electrode of transistors 62 and 64. Resistors 74 and 76 are each connected between the input and common ground terminal of amplifiers 18 and 20, respectively. A capacitor 78 is connected between the base of transistor 62 and ground while a capacitor 80 is connected between the base of transistor 64 and ground. Resistors 74, 76 and capacitors 78, 80 are filter networks which operate in conjunction with diodes 70, 72 to convert the audio output of amplifiers 18 and 20, respectively, into a substantially D.C. voltage for application to transistors 62 and 64, respectively. The actuating coils of the relays 24, 26 are each connected in series with the collector electrodes of transistors 62 and 64 and a common source of collector voltage indicated by the terminal 82 which is connected to a source of suitable potential (not shown).

The selector circuit 22 operates as follows. If no D.C. signal is applied to the base of either transistors 62 or 64 the voltage developed across emitter resistor 68 will bias them in an "off" position as described in more detail below. When a signal from either amplifier 18 or 20 is applied to the diode 70 or 72 connected thereto, the polarity connections of the diodes are such that a negative D. C. voltage is applied to the base electrode of either transistor 62 or 64, depending on the channel in use. Thus the transistor with the most negative signal applied to its base will conduct and the emitter voltage will approach the base voltage in value. All other transistors accordingly will be inactivated due to the potential developed across the common emitter resistor 68. Thus only the relay 24 or 26 associated with the transistor having the base signal of greatest magnitude will be energized. The remaining relays will be held in a deenergized position.

Channel selector 22 also includes a transistor 66 having a collector electrode connected through a load resistor 84 to the electrode voltage supply terminal 82. The emitter electrode of transistor 66 is also connected to the terminal of resistor 68 common to the emitter electrode of transistors 62 and 64. A pair of resistors 86 and 88 are connected both in series with each other and between terminal 82 and ground in a voltage divider arrangement to provide a bias voltage for the base electrode of transistor 66 which is connected to the common terminals of resistors 86 and 88. The values of resistors 86 and 88 are preferably selected to allow a current to flow through transistor 66 and resistor 68 of sufficient magnitude to develop a suitable bias potential thereacross for application to the emitter electrodes of transistors 62 and 64. This bias potential inactivates transistors 62 and 64 and consequently causes all relays 24, 26 to be deenergized during periods when no input signal is present. Accordingly, false or intermittent energization of channel relays 24, 26 by ambient background noise or other low level signals is prevented by the threshold action of the bias voltage developed across resistor 68.

It will be seen that whenever a signal is fed by one of channel amplifiers 18 or 20 to channel selector 22 with sufficient magnitude to overcome the threshold bias and cause energizing current to flow through the coil of relay 24 or 26, contacts 28 or 32 close and actuate either oscillator 30 or 34 while at the same time the opening of either contacts 54 or 58 will allow the gain of all stages but the one in control to be reduced. Small inequalities in the gains of the several channel amplifiers in the discrete channels will not cause a misidentification of the speaker due to the difference in the gain levels between the active and inactive channels. The reduction in the gain of the inactive channels also aids in reducing the noise of the system. Relays 24 and 26 should have a normal inherent time delay of about one half a second on both "pull in" and "drop out" to prevent soft speaking syllables of about one eigth of a second duration or less, or sharp noises, from causing misidentification.

The AVC voltage differential between active and passive channels is preferably adjusted to allow the louder of two voices to always capture the channel selector 22. Thus, when two speakers are speaking simultaneously the louder of the two will cause channel selector 22 to activate the corresponding identification oscillator. However, the weaker voice will still be heard on playback of the recording. Somewhere during the interchange the weaker voice will be heard alone, so that channel selector 22 will be captured thereby and activate the proper identification oscillator.

Although an embodiment of the novel dictating identification system has been described as utilizing transistors as electronic valves, yet it is understood that any suitable electronic valve such as a vacuum tube and suitably modified associated circuitry may be used to perform functions equivalent to the specified transistors. Furthermore, while the described embodiment of channel selector 22 incorporates transistors and relays to perform the selecting functions thereof, yet it will be understood that equivalent electronic circuits such as flip flop circuits or other gating circuits well known in the art may be employed to provide such functions.

The operation of the dictating portion of the present invention will now be described. Assume that microphone 10 is in use by a speaker. Speech signals received therefrom are amplified by audio amplifier 14 and fed to channel selector amplifier 18. The signals are also fed to the input of equalizer isolator 38 where they are properly equalized in accordance with the complementary recording characteristic of the recording device being used. The amplified and equalized speech signals are then fed through low pass filter 42 into recording amplifier 44 which drives recording head 46 to provide a permanent recording of the speaker's voice. The output of channel selector amplifier 18 is converted to D.C. by diode 70 and associated filter components 74, 78 and is then applied to transistor 62 thereby causing it to energize relay 24. Closing of contacts 28 actuate oscillator 30 which generates an identification signal having a selected frequency higher than the highest frequency designed to be transmitted through the pass band of filter 42. If the filter has a cutoff frequency of 4,000 cycles, then oscillator 30 may, for example, have an output frequency of 4,500 cycles. The identification signal is fed to recording head 46 by amplifier 44 simultaneously with the speech signals transmitted thereto by filter 42, and is superimposed on the voice recording. A portion of the output signal from amplifier 44 is also fed to AVC amplifier 52. The AVC voltage developed by amplifier 52 is applied directly to amplifier 16 and also to audio amplifier 14 but attenuated, in the latter case, a selected amount by resistor 56 which is connected in the AVC line to amplifier 14 when the short thereacross is removed upon opening of contacts 54.

When a speaker dictates into a microphone associated with one of the other channels the operation is similar to that just described since each channel has identical units except that the superimposed identifying oscillator frequency is different in each case. Thus, if another speaker were to use microphone 12 associated with channel N, signals representative of his voice would be applied to recording head 46 through amplifiers 16, 40, low pass filter 42 and recording amplifier 44. Likewise AVC voltage would be developed by amplifier 52 and applied directly to amplifier 14 and through now unshorted series resistor 60 to amplifier 16, since in this case, channel selector 22 would be actuated by signals from channel selector amplifier 20 and would energize relay 26. However, the frequency of oscillation supplied by correspondingly actuated oscillator 34 to recording amplifier 44 would differ from the frequency of oscillation supplied by oscillator 30. In one practical design of the invention it was found that if only five microphone channels were employed it was possible to use oscillator frequencies spaced at 500 cycle intervals. Such frequencies were within the frequency range of the recording apparatus, yet above the pass band of filter 42 which was designed to attenuate all frequencies above 4,000 cycles. If more than five microphones are used the spacing between identification frequencies may be closer and yet still come within the selectivity characteristics of economical frequency separation filters, which are described in detail hereinafter. Alternatively, when the present invention is employed with recorders having a satisfactory high frequency response, identification oscillator frequencies higher than 6,500 cycles may be used and the relatively wide spacing between identification frequencies retained.

When it is desired to transcribe information and identify simultaneously therewith the speaker from a recording prepared by the dictating embodiment of the invention in the manner just described, the transcribing or playback apparatus shown in Fig. 2 is used. A playback device 200, shown in block diagram form therein, is provided, which may be the usual transcribing head of a conventional recording device, such as a magnetic tape or endless magnetic belt playback head, or a pickup stylus when grooved records are used.

The output of the playback device 200 is fed to a conventional audio amplifier 202 which has a low pass filter 204 and a high pass filter 207 connected to its output. Low pass filter 204 is identical in characteristics to a low pass filter 42 of the recording system shown in Fig. 1 and described above. Low pass filter 204 transmits only the voice frequencies to amplifier 206 to which it is connected, and has a cutoff frequency lower than the speaker identification tone frequencies to prevent the passing of these high frequency tones to amplifier 206. An electromagnetic transducer 208, which may be a loudspeaker or a pair of headphones, is connected to the output of amplifier 206 to provide the usual audio output of the playback device. Amplifier 206 also has conventional audio gain controls and output switches for switching between the speaker and headphones (not shown).

High pass filter 207 has a cutoff frequency sufficiently low to prevent the transmission of voice frequency signals therethrough which would tend to overload indicator amplifier 209 connected to the output of high pass filter 207. The cutoff frequency of high pass filter 207 may be the same as the cutoff frequency of low pass filter 204, thus enabling the two filters to be designed to complement each other in accordance with conventional cross-over network design.

The output terminals of indicator amplifier 209 are connected to amplifiers 210, 212 which provide more effective isolation of the identification channels. Connected to the respective output terminals of isolation amplifiers 210 and 212 are band pass filters 214 and 216 which have design characteristics selected to pass only the identification frequencies associated with each channel and generated by oscillators 30 and 34 of the dictating system described previously. The outputs of band pass filters 214, 216 are connected to channel selector 218 which is similar to channel selector 22 shown in detail in Fig. 3. Each band pass filter 214 or 216 is respectively connected to the input of diode 70 and 72.

It will be seen that a common channel selector 22 may be used for both recording and playback by providing switches for connecting filters 214 and 216 to diodes 70 and 72 in place of amplifiers 18 and 20 when the playback feature is desired. Channel selector 218 has relays 220 and 222 connected to the output of each channel in a manner similar to relays 24 and 26. A visual indicating device 224 is connected, upon the closing of contacts 226 associated with relay 220, to a source of potential 228 and is actuated when relay 226 is energized. A similar visual indicating device 230 is connected to the source of potential 228 and to normally open contacts 232 of relay 222, and is likewise energized when relay 222 is closed.

During operation of the playback system the high frequency identification signal associated with each speaker is therefore selected by its complementary band pass filter 214 or 216 and fed to channel selector 218 where it is rectified and filtered as described above in connection with channel selector 22, and causes either relay 220 or 222 to be energized. The indicating devices 224, 230, which may be signal lamps or other visible indicating devices, then will be actuated to provide an indication to the transcriber operator of the identity of the speakers whose voices are being transcribed at any given instant.

When the present invention is employed with a conventional dictating machine, the apparatus will be operated by the transcriber in a normal fashion except that a bank of lights or other indicating devices mounted on a suitable display panel will be visible and each will designate a selected speaker. At the beginning of the transcribing session the operator needs only to correlate a lamp with the speaker's name which is spoken into his microphone at the beginning of the session. Then the operator may proceed to type the transcript in the normal manner, but with the additional information as to the identity of the speakers being constantly supplied by indicators 224, 230. If two persons are speaking at once, only one indicator will be actuated at a time and this indicator will correspond to the channel which has received the strongest signal. However, as mentioned heretofore, ordinarily each light will flash sometime during such an exchange, and since the loudest voice will always correspond to the actuated indicator 224, 230, identification is never difficult. It will be understood that the appropriate indicator will be actuated during the entire length of the speech.

The invention is not limited to the use of lamps or other visual indicators, but any other suitable indicators, adapted to be selectively energized, may be employed. For example, audio signalling devices adapted to emit discrete output signals of different frequencies or having distinctive audible tone patterns and capable of being easily associated with a speaker may be used.

It will be seen that a number of the units comprising the recording and playback embodiments of the present invention while performing different functions in each case, are identical in design and construction and therefore may be switched conventionally from record to playback or vice versa, with consequent savings in cost and size of the overall system. Thus low pass filter 42 may be switched into the playback system to perform the functions of low pass filter 204. Likewise channel selector 22 may be switchably connected in place of channel selector 218 during the playback period and relays 24 and 26 may be provided with another set of contacts 226 and 232 which are placed in operation during playback to eliminate the need for separate relays 220 and 222.

While the present invention has been disclosed by means of specific illustrative embodiments thereof, it would be obvious to those skilled in the art that various changes and modifications in the means of operation, description or in the apparatus may be made without departing from the spirit of the invention as defined in the appended claims.

I claim:

1. A dictating identification system comprising a plurality of dictating stations and a sound recorder positioned remotely therefrom, a plurality of selectively operable audio oscillators with output signals of diverse characteristics having outputs connected to said recorder, each of said oscillators being associated with a discrete dictating station, means connected between each of said dictating stations and said recorder for translating oral dictation received by each station into a speech signal adapted to be recorded, and means connected to said speech translating means and operative in response to reception of a speech signal from each station by said dictation translating means for actuating only the oscillator associated therewith, the signal output of said actuated oscillator being recorded concurrently with the speech signal from said associated station to provide a signal for identifying said dictating station, when said recorded speech signal is transcribed.

2. A dictating identification system comprising a plurality of dictating stations and a sound recorder positioned remotely therefrom, means positioned at each dictating station and connected to said recorder for translating oral dictation received at each station into a speech signal adapted to be recorded, means for generating a discrete signal for identifying each of said stations, means connected to said generating means and to said recorder and operative in response to reception of a speech signal by said dictation translating means to transmit said discrete identification signal associated with said received signal to said recorder, said recorder having reproducible sound record means for concurrently recording each of said speech signals and said respectively associated identification signals, transcribing means operatively associated with said recorder and said sound record means and operative to translate said speech signal recorded on said sound record into audible sound, indicating means associated with said transcribing means and operable to indicate the dictating station associated with a speech signal being transcribed, and means connected to said transcribing means and responsive to each of said recorded identification signals for selectively actuating said indicating means to automatically identify the dictating station associated with the speech signal being transcribed.

3. The invention defined in claim 2 including means for incapacitating said identification signal transmitting means until a signal of predetermined magnitude is received by said dictation translating means.

4. The invention defined in claim 2 wherein said means for selectively actuating said indicating means includes means for actuating said indicating means concurrently with said speech signal being transcribed for the duration of said speech signal to provide continuous identification of the dictating station associated therewith.

5. The invention defined in claim 2 wherein each of said means positioned at each station for translating oral dictation into a speech signal includes means for emphasizing the high frequency components of said signals to increase the discrimination between oral dictation directed to said station and extraneous sounds remote from said station.

6. The invention defined in claim 2 including automatic gain control means operative in response to reception of a signal by said recorder for decreasing the signal response of said dictation translating means associated with each station to prevent misidentification.

7. The invention defined in claim 6 wherein said automatic gain control means includes means actuated by said identification signal transmitting means for decreasing the signal response of said actuated dictation translating means a lesser amount than said other dictation translating means.

8. A dictating identification system comprising a plurality of dictating stations and a sound recorder positioned remotely therefrom, a plurality of selectively operable audio oscillators connected to said recorder and having discrete output frequencies, each of said oscillators being associated with a discrete dictating station, means connected between each of said dictating stations and said recorder for translating oral dictation received by each station into a speech signal adapted to be recorded, means connected to said speech translating means and operative in response to reception of a speech signal from each station by said dictation translating means for actuating only the oscillator associated therewith, said recorder having reproducible sound record means for recording the signal output of said actuated oscillator concurrently with the speech signal from said associated station to form a composite signal thereon, transcribing means operatively associated with said recorder and said sound record means and including means for translating the speech components of said composite signal recorded on said record into audible sound, indicating means associated with said transcribing means and operable to indicate the discrete dictating station associated with a speech signal being transcribed, and means connected to said transcribing means and responsive to a selected frequency of each recorded oscillator signal for selectively actuating said indicating means to indicate the dictating station associated with the speech signal being transcribed.

9. The invention defined in claim 8 wherein said indicating means includes a plurality of lamps, each lamp being associated with one of said stations and adapted to be selectively illuminated in response to an associated oscillator signal to identify the station associated therewith.

10. The invention defined in claim 8 wherein said oscillator actuating means includes a switching device connected to each oscillator and having input terminals connected to said dictation translating means associated therewith, said switching device being operative to energize the oscillator connected thereto whenever a speech signal having a predetermined amplitude is received by said input terminals.

11. A dictating identification system comprising a plurality of dictating stations and a sound recorder positioned remotely therefrom, means positioned at each dictating station and connected to said recorder for translating oral dictation received at each station into a speech signal adapted to be recorded, means connected to said speech translating means and operative to generate a discrete identification signal for identifying each of said stations each time one of said dictation translating means is actuated, means operative in response to the speech signal having the greatest amplitude when several speech signals are recorded concurrently for transmitting to said recorder only the identification signal for said station associated with said greatest amplitude signal, said recorder having reproducible sound record means for concurrently recording each of said speech signals and said respectively associated identification signals, transcribing means operatively associated with said recorder and said sound record means and operable to translate said speech signal recorded on said sound record into audible sound, indicating means associated with said transcribing means and operable to indicate the dictating station associated with a speech signal being transcribed, and means connected to said transcribing means and responsive to each of said recorded identification signals for selectively actuating said indicating means to automatically identify the dictating station associated with the speech signal of greatest amplitude.

12. The invention defined in claim 11 including automatic gain control means operative in response to the reception of a speech signal by said recorder for decreasing the signal response of said dictation translating means associated with each station and means responsive to the speech signal having the greatest amplitude for decreasing the signal response of the dictation translating means associated therewith a lesser amount than the decrease in response of said other translating means.

13. A dictating identification system comprising a plurality of dictating stations and a sound recorder positioned remotely therefrom, means positioned at each dictating station and connected to said recorder for translating oral dictation received at each station into a speech signal adapted to be recorded, means connected to said speech translating means and operative to generate a discrete signal for identifying each of said stations, an identifying signal selector connected to each of said dictation translation means and to said identifying signal generating means and operative in response to reception from said translating means of a speech signal of predetermined amplitude to cause said signal generator to generate said corresponding identification signal, means connected to said signal generator and operative to transmit said generated identification signal to said recorder, said recorder having reproducible sound record means for concurrently recording said speech signal and said respectively associated identification signal, transcribing means operatively associated with said recorder and said sound record means and operable to translate said speech signal recorded on said sound record into audible sound, indicating means including a plurality of indicator devices for indicating the dictation station associated with a speech signal being transcribed, and means connected to said transcribing means and responsive to said recorded identifying signal for selectively actuating an indicator device to automatically identify the dictating station associated with said signal being transcribed.

14. A dictating identification system comprising a plurality of dictating stations and a sound recorder positioned remotely therefrom, means positioned at each dictating station and connected to said recorder for translating oral dictation received at each station into a speech signal adapted to be recorded, means connected to said speech translating means and operative to generate a discrete signal for identifying each of said stations, means connected to said generating means and operative in response to reception of a speech signal from each station by said dictation translating means to transmit said discrete identification signal associated with said received speech signals to said recorder, said identification signal being superimposed on an associated speech signal to form a composite signal each time one of said dictation translating means is actuated, said recorder having reproducible sound record means for recording said composite signal, transcribing means operatively associated with said recorder and said sound record means and operative to translate the speech components of said composite recorded signal into audible sound, said transcribing means including a speech signal channel and an identification signal channel, an audible sound reproducing device being connected to said speech channel, a low pass filter connected in said speech channel and operative to transmit only said speech frequencies to said sound reproducing device, a high pass filter connected to said identification channel and adapted to transmit only the identifying signal components of said recorded signal, indicating means including a plurality of indicating devices for indicating the dictating station associated with the signal being transcribed, and means connected to said high pass filter and said indicating means and responsive to each of said identification signals for actuating a selected indicating device to automatically identify the dictating station associated with the signal being transcribed.

15. A dictating identification system comprising a plurality of dictating stations and a sound recorder positioned remotely therefrom, means positioned at each dictating station and connected to said recorder for translating oral dictation received at each station into a speech signal adapted to be recorded, means connected to said speech translating means and operative to generate a discrete signal for identifying each of said stations, means connected to said generating means and operative in response to reception of a speech signal from each station by said dictation translating means to transmit said discrete identification signal associated with said received speech signal to said recorder, said recorder having reproducible sound record means for concurrently recording each of said speech signals and said respectively associated identification signals simultaneously to form a composite signal, transcribing means operatively associated with said recorder and said sound record means and including means operative to separate the speech components of said recorded composite signal from the identification signal components, means connected to said separating means and operative to translate the speech components of said recorded signal into audible sound, indicating means including a plurality of indicating devices for indicating the dictating station associated with the signal being transcribed, and means connected to said separating means and responsive to each of said separated identification signal components for actuating a corresponding indicating device to automatically identify the dictating station associated with a speech signal being transcribed.

16. A dictating identification system comprising a plurality of dictating stations and a sound recorder positioned remotely therefrom, means positioned at each dictating station and connected to said recorder for translating oral dictation received at each station into a speech signal adapted to be recorded, means connected to said speech translating means and operative to generate a discrete signal for identifying each of said stations, means connected to said generating means and operative in response to reception of a speech signal from each station by said dictation translating means to transmit said discrete identification signal associated with said received speech signal to said recorder, said identification signal being superimposed on an associated speech signal to form a composite signal each time one of said dictation translating means is actuated, said recorder having reproducible sound record means for recording said composite signal, transcribing means operatively associated with said recorder and said sound record means and operable to translate the speech components of said composite recorded signal into audible sounds, indicating means including a plurality of indicating devices for indicating the dictating station associated with a signal being transcribed, and means connected to said transcribing means and responsive to each of said identification signals for actuating a selected indicating device to automatically identify the dictating station associated with a speech signal being transcribed.

17. A dictating identification system comprising a plurality of dictating stations and a sound recorder positioned remotely therefrom, means positioned at each dictating station and connected to said recorder for translating oral dictation received at each station into a speech signal adapted to be recorded, means for generating a discrete signal for identifying each of said stations, means connected to said generating means and to said recorder and operative in response to reception of a speech signal by said dictation translating means to transmit said discrete identification signal associated with said received signal to said recorder, said recorder having reproducible sound record means for concurrently recording each of said speech signals and said respectively associated identification signals, whereby each of said recorded speech signals is provided with an identifying signal when said recorded speech signal is transcribed.

18. The invention defined in claim 17 including means for incapacitating said identification signal transmitting means until a signal of predetermined magnitude is received by said dictation translating means.

19. The invention defined in claim 17 including automatic gain control means operative in response to reception of a signal by said recorder for decreasing the signal response of said dictation translating means associated with each station to prevent misidentification.

20. The invention defined in claim 17 wherein said automatic gain control means includes means actuated by said identification signal transmitting means for decreasing the signal response of said actuated dictation translating means a lesser amount than said other dictation translating means.

21. A dictating identification system comprising a plurality of dictating stations and a sound recorder positioned remotely therefrom, means positioned at each dictating station and connected to said recorder for translating oral dictation received at each station into a speech signal adapted to be recorded, means connected to said speech translating means and operative to generate a discrete identification signal for identifying each of said stations each time one of said dictation translating means is actuated, means operative in response to the speech signal having the greatest amplitude when several speech signals are recorded concurrently for transmitting to said recorder only the identification signal for said station associated with said greatest amplitude signal, said recorder having reproducible sound record means for concurrently recording each of said speech signals and said respectively associated identification signals, whereby each of said recorded speech signals is provided with an identifying signal when said speech signal is transcribed.

22. A dictating identification system comprising a plurality of dictating stations and a sound recorder positioned remotely therefrom, means positioned at each dictating station and connected to said recorder for translating oral dictation received at each station into a speech signal adapted to be recorded, means connected to said speech translating means and operative to generate a discrete signal for identifying each of said stations, an identifying signal selector connected to each of said dictation translation means and to said identifying signal generating means and operative in response to reception from said translating means of a speech signal of predetermined amplitude to cause said signal generator to generate said corresponding identification signal, means connected to said signal generator and operative to transmit said generated identification signal to said recorder, said recorder having reproducible sound record means for concurrently recording said speech signal and said respectively associated identification signal, whereby each of said recorded speech signals is provided with an identifying signal when said speech signal is transcribed.

References Cited in the file of this patent

UNITED STATES PATENTS

| | | |
|---|---|---|
| 2,529,097 | Mullin | Nov. 7, 1950 |
| 2,660,621 | Billar | Nov. 24, 1953 |
| 2,668,283 | Mullin | Feb. 2, 1954 |
| 2,702,315 | Roderick | Feb. 15, 1955 |
| 2,786,101 | Balmer | Mar. 19, 1957 |

FOREIGN PATENTS

| | | |
|---|---|---|
| 763,341 | Great Britain | Dec. 12, 1956 |